(12) United States Patent
Schäfer et al.

(10) Patent No.: US 12,361,276 B2
(45) Date of Patent: Jul. 15, 2025

(54) APPARATUSES AND METHODS FOR TRAINING A MACHINE LEARNING NETWORK FOR USE WITH A TIME-OF-FLIGHT CAMERA

(71) Applicant: Sony Semiconductor Solutions Corporation, Kanagawa (JP)

(72) Inventors: Henrik Schäfer, Stuttgart (DE); Enrico Buratto, Lozzo Atestino (IT); Gianluca Agresti, Rotondella (IT); Pietro Zanuttigh, Padua (IT)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1117 days.

(21) Appl. No.: 17/110,330

(22) Filed: Dec. 3, 2020

(65) Prior Publication Data
US 2021/0166124 A1    Jun. 3, 2021

(30) Foreign Application Priority Data

Dec. 3, 2019   (EP) ..................................... 19213233

(51) Int. Cl.
*G06N 3/08* (2023.01)
*G01S 17/894* (2020.01)
(Continued)

(52) U.S. Cl.
CPC .............. *G06N 3/08* (2013.01); *G01S 17/894* (2020.01); *G06N 3/04* (2013.01); *H04N 13/254* (2018.05)

(58) Field of Classification Search
CPC .......... G06N 3/08; G06N 3/04; G01S 17/894; G01S 7/497; G01S 17/36; H04N 13/254
See application file for complete search history.

(56) References Cited

U.S. PATENT DOCUMENTS 9,542,749 B2    1/2017 Freedman et al.
9,760,837 B1    9/2017 Nowozin et al.
(Continued)

OTHER PUBLICATIONS

Velten et al., "Recovering three-dimensional shape around a corner using ultrafast time-of-flight imaging", Nature Communications vol. 3, Article No. 745 (2012), https://doi.org/10.1038/ncomms1747 (Year: 2012).*

(Continued)

*Primary Examiner* — Abdullah Al Kawsar
*Assistant Examiner* — Tewodros E Mengistu
(74) *Attorney, Agent, or Firm* — XSENSUS LLP

(57) ABSTRACT

The present disclosure proposes a concept of training a machine learning network for use with a ToF camera. Based on a predefined synthetic scene, it is simulated a ground truth time resolved illumination return signal for a light pulse emitted from the ToF camera to the synthetic scene and scattered back from the synthetic scene to the ToF camera. The synthetic scene comprises a plurality of scene points with known distances between each of the scene points and the ToF camera. Based on the ground truth time resolved illumination return signal and a simulation model of the ToF camera, it is then simulated an output signal of at least one ToF pixel capturing the synthetic scene. Based on the simulated output signal of the ToF pixel and the ground truth time resolved illumination return signal, weights of the machine learning network are adjusted to cause the machine learning network to map the simulated output signal of the ToF pixel to an output time resolved illumination return signal approximating the ground truth time resolved illumination return signal.

16 Claims, 7 Drawing Sheets

(51) Int. Cl.
    G06N 3/04      (2023.01)
    H04N 13/254    (2018.01)

(56) References Cited

U.S. PATENT DOCUMENTS

2016/0314613 A1* 10/2016 Nowozin ................ G01S 7/497
2017/0262768 A1*  9/2017 Nowozin .............. G06F 18/214
2019/0295282 A1*  9/2019 Smolyanskiy .......... G06F 18/22
2020/0093386 A1*  3/2020 Biswas ................ A61B 5/7267

OTHER PUBLICATIONS

Martinez et al., "Relaxed Earth Mover's Distances for Chain- and Tree-connected Spaces and their use as a Loss Function in Deep Learning", 2016, arXiv:1611.07573 (Year: 2016).*

Ruvalcaba-Cardenas et al., "Object classification using deep learning on extremely low-resolution time-of-flight data" (Year: 2018).*

Extended European Search Report received for EP Application No. 19213233.0, mailed on Apr. 21, 2020, 10 pages.

Gariepy et al., "Detection and tracking of moving objects hidden from view", Nature Photonics, vol. 10, No. 1, XP055238474, Dec. 7, 2015, pp. 23-26.

Freedman et al., "SRA: Fast Removal of General Multipath for ToF Sensors", Mar. 24, 2014, pp. 1-15.

Peters et al., "Solving Trigonometric Moment Problems for Fast Transient Imaging", 11 pages.

* cited by examiner

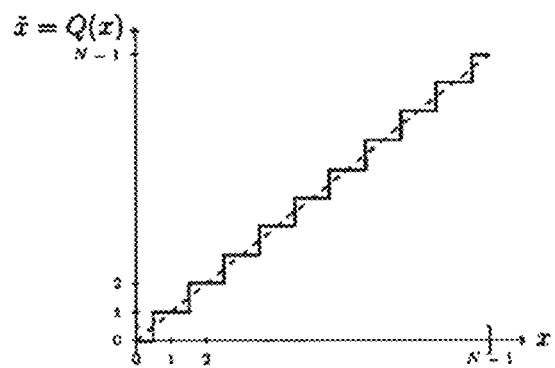

FIG. 9

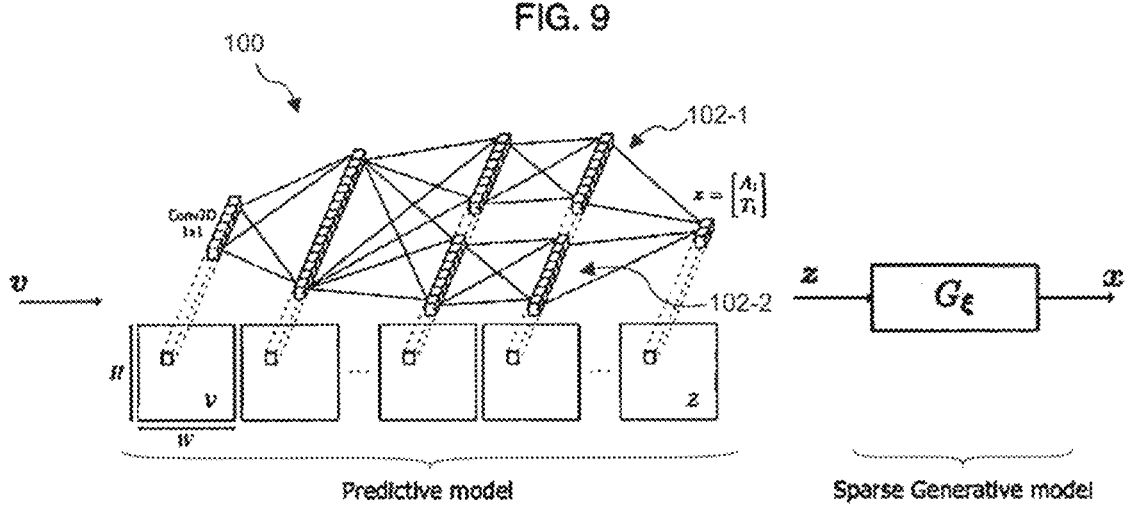

FIG. 10A

| Layer | Kernel size | Input dimension | Output dimension | Activation |
|---|---|---|---|---|
| Conv $c_1(v)$ | $1 \times 1 \times 6 \times 64$ | $W \times H \times 6$ | $W \times H \times 64$ | Relu |
| Conv $c_2(c_1)$ | $1 \times 1 \times 64 \times 64$ | $W \times H \times 64$ | $W \times H \times 64$ | Relu |
| Conv $c_3(c_2)$ | $1 \times 1 \times 64 \times 64$ | $W \times H \times 64$ | $W \times H \times 64$ | Relu |
| Conv $a_1(c_3)$ | $1 \times 1 \times 64 \times 32$ | $W \times H \times 64$ | $W \times H \times 32$ | Relu |
| Conv $a_2(a_1)$ | $1 \times 1 \times 32 \times 16$ | $W \times H \times 32$ | $W \times H \times 16$ | Relu |
| Conv $a_3(a_2)$ | $1 \times 1 \times 16 \times 1$ | $W \times H \times 16$ | $W \times H \times 1$ | Sigmoid |
| Conv $t_1(c_3)$ | $1 \times 1 \times 64 \times 32$ | $W \times H \times 64$ | $W \times H \times 32$ | Relu |
| Conv $t_2(t_1)$ | $1 \times 1 \times 32 \times 16$ | $W \times H \times 32$ | $W \times H \times 16$ | Relu |
| Conv $t_3(t_2)$ | $1 \times 1 \times 16 \times 1$ | $W \times H \times 16$ | $W \times H \times 1$ | Sigmoid |
| Concat $z(a_3, t_3)$ | | $W \times H \times 1$, $W \times H \times 1$ | $W \times H \times 2$ | |

FIG. 10B

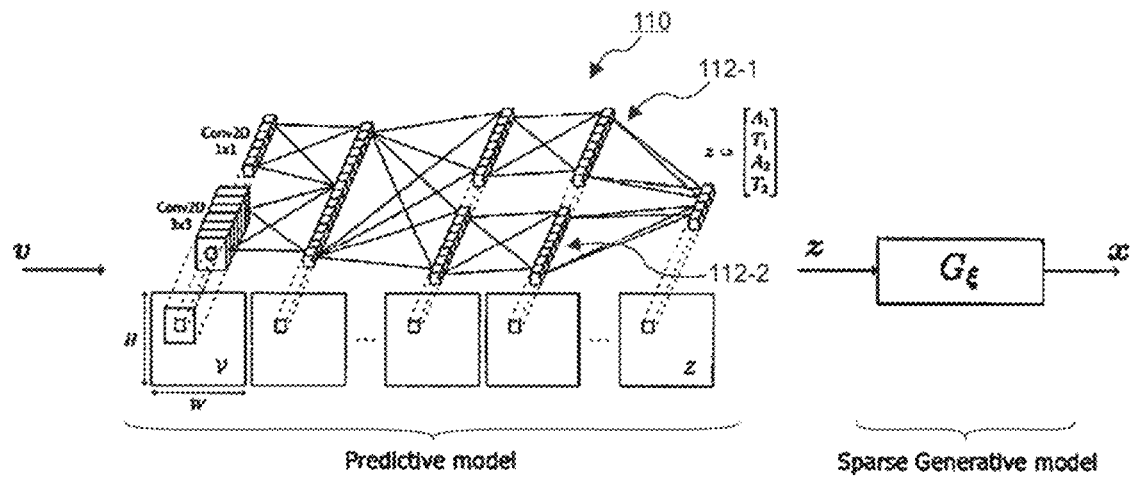

FIG. 11A

| Layer | Kernel size | Input dimension | Output dimension | Activation |
|---|---|---|---|---|
| Conv & Slice $c_p(\mathcal{V})$ | $1 \times 1 \times 6 \times 64$ | $(W+2) \times (H+2) \times 6$ | $W \times H \times 64$ | Relu |
| Conv $c_l(\mathcal{V})$ | $3 \times 3 \times 6 \times 64$ | $(W+2) \times (H+2) \times 6$ | $W \times H \times 64$ | Relu |
| Concat $c_1(c_p, c_l)$ | | $W \times H \times 64$, $W \times H \times 64$ | $W \times H \times 128$ | |
| Conv $c_2(c_1)$ | $1 \times 1 \times 64 \times 64$ | $W \times H \times 128$ | $W \times H \times 64$ | Relu |
| Conv $c_3(c_2)$ | $1 \times 1 \times 64 \times 64$ | $W \times H \times 64$ | $W \times H \times 64$ | Relu |
| Conv $a_1(c_3)$ | $1 \times 1 \times 64 \times 32$ | $W \times H \times 64$ | $W \times H \times 32$ | Relu |
| Conv $a_2(a_1)$ | $1 \times 1 \times 32 \times 16$ | $W \times H \times 32$ | $W \times H \times 16$ | Relu |
| Conv $a_3(a_2)$ | $1 \times 1 \times 16 \times 2$ | $W \times H \times 16$ | $W \times H \times 2$ | Sigmoid |
| Conv $t_1(c_3)$ | $1 \times 1 \times 64 \times 32$ | $W \times H \times 64$ | $W \times H \times 32$ | Relu |
| Conv $t_2(t_1)$ | $1 \times 1 \times 32 \times 16$ | $W \times H \times 32$ | $W \times H \times 16$ | Relu |
| Conv $t_3(t_2)$ | $1 \times 1 \times 16 \times 2$ | $W \times H \times 16$ | $W \times H \times 2$ | Sigmoid |
| Concat $z(a_3, t_3)$ | | $W \times H \times 2$, $W \times H \times 2$ | $W \times H \times 4$ | |

FIG. 11B

APPARATUSES AND METHODS FOR TRAINING A MACHINE LEARNING NETWORK FOR USE WITH A TIME-OF-FLIGHT CAMERA

CROSS-REFERENCE TO RELATED APPLICATION

The present application claims priority to European Patent Application No. 19213233.0 filed in the European Patent Office on Feb. 27, 2020, the entire contents of which are incorporated herein by reference.

FIELD

The present disclosure relates to the field of Time-of-Flight (ToF) cameras and, more particularly, to apparatuses and methods for training a Machine Learning (ML) network for use with a ToF camera.

BACKGROUND

Time-of-Flight (ToF) cameras are measuring distances of imaged targets for each pixel of a camera sensor. A pixel typically comprises a photo sensitive element (e.g. a photo diode) which converts incoming light into an electric signal, such as current, for example. So-called indirect ToF cameras using RF-modulated (RF=Radio Frequency) light sources with phase detector imagers suffer from a number of error sources. One inherent issue of the technology is caused by multiple reflections of an emitted light pulse in a scene, which leads to a time resolved illumination return signal. This time resolved illumination return signal can be understood as the scene's backscattering response to a delta pulse of light and typically comprises a plurality of signal echo components due to multipath propagation of the light in the scene, the echo components having different levels of constant intensity offset depending on background illumination. The time resolved illumination return or backscattering signal typically causes measurement of an increased distance, compared to the intended first response measurement. This so-called multipath interference (MPI) is a well-known problem and has been addressed in many publications. A couple of approaches exist to reduce the MPI effect, but only to a limited degree or for specific scenes. So-called direct ToF cameras using a single light pulse per frame (e.g. 30 Hz) record a time resolved intensity histogram and can overcome the problem because in the temporal domain typically the first response is the desired depth value. But direct ToF cameras are comparatively complex, expensive and only available in low resolution.

Therefore, there is a need for improved distance measurement for indirect ToF cameras.

SUMMARY

This need is addressed by apparatuses, methods, and computer programs in accordance with the independent claims. Advantageous embodiments are further addressed by the dependent claims.

According to a first aspect of the present disclosure it is provided a method of training a machine learning network for use with a ToF camera. The method includes simulating, based on a predefined synthetic scene, a ground truth time resolved illumination return signal for a light pulse emitted from the ToF camera to the synthetic scene and scattered back from the synthetic scene to the ToF camera. The synthetic scene comprises a plurality of scene points with known distances between each of the scene points and the ToF camera. The method further includes simulating, based on the ground truth time resolved illumination return signal and a simulation model of the ToF camera, an output signal of at least one ToF pixel capturing the synthetic scene. The method further includes adjusting, based on the simulated output signal of the ToF pixel and the ground truth time resolved illumination return signal, weights of the machine learning network to cause the machine learning network to map the simulated output signal of the ToF pixel to an output time resolved illumination return signal approximating the ground truth time resolved illumination return signal. A skilled person having benefit from the present disclosure will appreciate that embodiments of the method of training the machine learning network for use with a ToF camera may include computer-implemented methods.

The use of synthetic (artificial) scenes and simulated data can enable the use of error free training data for the machine learning network because the machine learning network is not trained to reconstruct a certain ToF depth value but the time resolved illumination return signal (also referred to as backscattering vector), which is also used to generate the input data (phasors and intensity data provided by the ToF camera simulation) for the machine learning network.

In some embodiments, simulating the ground truth time resolved illumination return signal may comprise simulating non-line-of-sight light components scattered back from the synthetic scene to the ToF camera based on transient rendering. The simulation of transient light transport is comparable to regular physically-based rendering, except that for each light path that contributes to an image, its optical length is calculated and its contribution may be stored in a time-of-flight histogram. In some embodiments, the simulated ground truth time resolved illumination return signal may comprise direct line of sight light components that are coming from at least two different distances, e.g. either because of a depth edge falling into one pixel or because of a transparent or semi-transparent object.

The skilled person having benefit from the present disclosure will appreciate that it may be beneficial to use a possibly realistic simulation model of the ToF camera to transform the simulated ground truth time resolved illumination return signal into phasor and intensity data. Specific camera properties, like the exact illumination shape and sensor sensitivity shape, as well as noise levels and other pixel properties can be included here. Therefore, in some embodiments, the simulation model of the ToF camera may model specific camera properties including at least one of exact illumination shape, sensor sensitivity shape, and noise levels.

In some embodiments, simulating the output signal of at least one ToF pixel can optionally comprise simulating the output signal of the ToF pixel for a plurality of different light modulation frequencies to generate respective output signals for each of the different light modulation frequencies. The weights of the machine learning network may be adjusted based on the simulated output signals for the different light modulation frequencies as input to the machine learning network and based on the respective simulated ground truth ground truth time resolved illumination return signals. Thus, the machine learning network can be trained for different light modulation frequencies, also allowing to extend an unambiguous range of the ToF camera.

In some embodiments, adjusting the weights of the machine learning network comprises minimizing a difference between the output time resolved illumination return signal and the ground truth time resolved illumination return signal. This can be done using appropriate distance metrics between the output time resolved illumination return signal and the ground truth time resolved illumination return signal taking one or more multipath components into account. In one example embodiment, the difference between the output time resolved illumination return signal and the ground truth time resolved illumination return signal can be measured according to the Earth Mover's Distance (EMD) which is a measure of the distance between two probability distributions over a region D.

In some embodiments, the method of training can be repeated for each of a plurality of ToF pixels of a ToF pixel array of the ToF camera. The skilled person having benefit from the present disclosure will appreciate that each ToF pixel captures a different scene point or region of the synthetic scene. Furthermore, the method of training can also be repeated for a plurality of different predefined synthetic scenes in order to increase the amount of training data for the machine learning network.

In some embodiments, the machine learning network may comprise a Convolutional Neural Network (CNN) architecture, which is a class of deep neural networks, commonly applied to analyzing visual imagery. A CNN comprises an input and an output layer, as well as multiple hidden layers. The hidden layers of a CNN typically comprise a series of convolutional layers that convolve with a multiplication or other dot product. The skilled person having benefit from the present disclosure will appreciate that embodiments are not limited to CNNs. Of course, also other machine learning network architectures may be applicable as well.

In some embodiments, the ToF camera may be an indirect ToF camera. As mentioned above, particularly indirect ToF cameras may suffer from measurement inaccuracies due to multiple reflections. Therefore, the teachings of the present disclosure may be particularly useful for improving measurements of indirect ToF cameras.

According to a further aspect of the present disclosure it is provided a method for operating a ToF camera. The method comprises capturing a scene with a ToF pixel matrix of the ToF camera, feeding output signals of the ToF pixel matrix into a machine learning network trained according to the method of any one of the previously mentioned embodiments, and providing, at an output of the trained machine learning network, time resolved illumination return signals (backscattering vectors) associated with pixels of the ToF pixel matrix. Here, the captured scene may be a real or natural scene. An indirect ToF camera coupled to a trained machine learning network may thus deliver time resolved illumination return or backscattering vectors, similar to a direct ToF camera.

According to a further aspect of the present disclosure it is also provided a computer program having a program code for performing a method of any one of the previously mentioned embodiments, when the computer program is executed on a programmable hardware device, such as a CPU or GPU, for example.

According to a further aspect of the present disclosure it is also provided a ToF camera comprising a machine learning network trained according to the method of any one of previously mentioned embodiments.

In some embodiments, an input layer of the machine learning network may be coupled to an output of a ToF pixel matrix of the ToF camera. In some embodiments, the output of the ToF pixel matrix may be coupled to an input layer of a trained CNN.

In some embodiments, the machine learning network may be configured to output a time resolved illumination return signal (backscattering vector) associated with each pixel of the ToF pixel matrix.

In some embodiments, the ToF camera may be an indirect ToF camera.

Transforming indirect ToF data into direct TOF data may solve the MPI problem of indirect ToF cameras for many scene configurations. It may also offer additional insight into the scene properties. Since the machine learning network is not trained to reconstruct the scene geometry, but only the backscattering vector, there is no need for a large database of physically correct scene simulations. Also, embodiments merely evaluate the data on a per-pixel basis, so a simulation of a single scene offers a large quantity of training data. Embodiments may also be highly parallelizable, because only the data from a single pixel or a small neighborhood may be used.

BRIEF DESCRIPTION OF THE FIGURES

Some examples of apparatuses and/or methods will be described in the following by way of example only, and with reference to the accompanying figures, in which

FIG. 9 illustrates a mid-tread quantizer with unitary quantization step;

FIG. 10A illustrates an embodiment of the proposed deep learning approach with a first CNN implementing the predictive model;

FIG. 10B illustrates properties of the example CNN of FIG. 10A;

FIG. 11A illustrates an embodiment of the proposed deep learning approach with a second CNN implementing the predictive model;

FIG. 11B illustrates properties of the example CNN of FIG. 11A;

DETAILED DESCRIPTION

Figure 1:
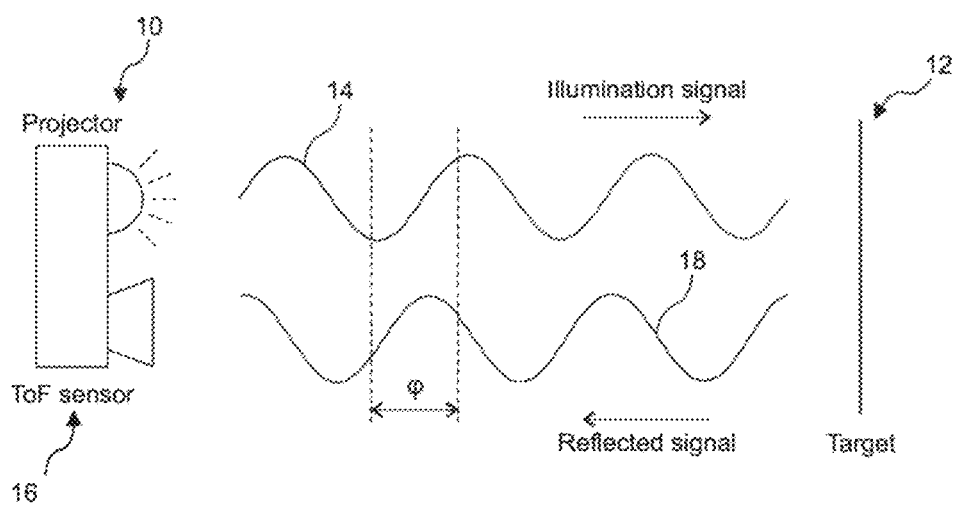
FIG. 1 illustrates an indirect ToF camera principle.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Time-of-Flight (ToF) technology is a relatively new type of ranging image technique that has become increasingly popular in the last years. Compared to other technologies for obtaining scene depth, ToF cameras are more versatile and this makes them useful in a wide range of applications, such as pose estimation, coarse 3D reconstruction, human body parts recognition and tracking, augmented reality, scene understanding, autonomous driving, robotic navigation systems, and so on. ToF depth measurements are based on the well-known time-of-flight principle. ToF cameras work illuminating the scene with a light signal and estimating the depth by measuring the time t taken by the light to come back to the camera sensor. Since speed of light in air is rather constant (in vacuum c=299 792 458 m/s) the relationship between depth and time results:

$$d = \frac{ct}{2}$$

The success of this kind of systems is driven by their benefits. For example, they may simultaneously capture dense depth and intensity images at high frame rate, they have low weight and compact design without any moving parts and do not suffer the occlusions problem.

There are two main types of ToF technologies. Sensors based on discrete pulse modulation that measure the time-of-flight directly, or sensors based on Amplitude Modulated Continuous Wave (AMCW) that measure the time-of-flight indirectly. AMCW sensors estimate the time looking at the phase displacement φ between the emitted and the received light signals, as illustrated in FIG. 1.

An AMCW ToF camera 10 illuminates a scene 12 with an amplitude modulated continuous near-infrared light signal 14 at frequency $f_m$, and a camera sensor 16 computes for each pixel the phase displacement between a reflected signal 18 and an internal reference clock. Typically, the frequency $f_m$ of the amplitude modulation is in the megahertz (MHz) range. Knowing the phase shift φ∈[0, 2π), it is possible to derive corresponding time-of-flight and depth values.

Without loss of generality, the present disclosure focuses on indirect (AMCW) ToF systems since currently they are the most available and widely used ToF cameras on the market. Beside all these good aspects, ToF cameras are subject to some limitations that need to be further analyzed and improved.

Figure 2:
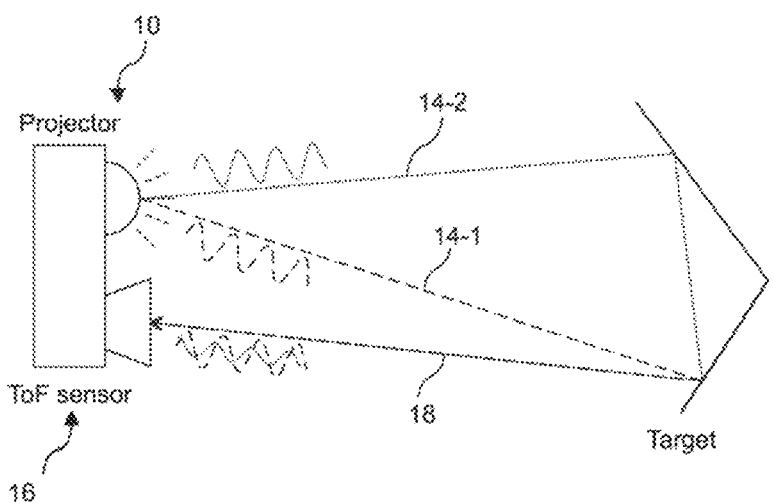
FIG. 2 illustrates an example of MPI generated by two specular reflections.
Figure 3:
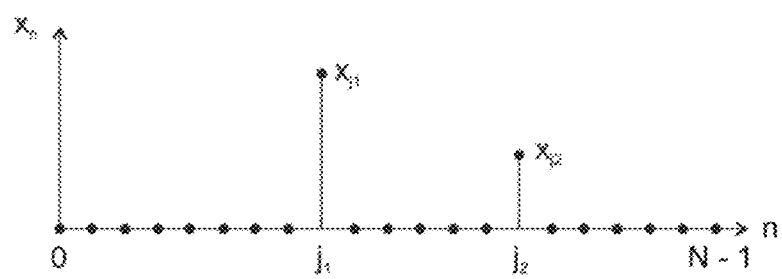
FIG. 3 illustrates a backscattering vector in case of two specular reflections.

One of the main sources of errors in ToF technology is the Multi-Path Interference (MPI) phenomenon. The basic principle of AMCW cameras relies on the hypothesis that each pixel receives a single optical ray emitted by the projector and bounced only once in the scene. This ideal assumption, unfortunately, is violated in most real-world scenarios and each pixel receives a superposition of multiple optical rays coming from different points in the scene 12. This is illustrated in FIG. 2. This MPI phenomenon introduces a non-systematic error in the depth estimation, typically very difficult to be corrected since it is highly scene-dependent and thus unpredictable. The MPI effect can occur either intra-camera, due to the light reflection and scattering with an imaging lens and aperture, or inside the scene. Multiple returns are caused by multiple propagation paths 14-1, 14-2 between the light source and the sensor's 16 pixels. From geometrical considerations it follows that the primary return, that is the one that covers a smaller distance, is associated to the true depth value, while the other interfering rays are associated to higher order reflections. Typically, the primary return turns out to be also the brightest, though it need not be. A corresponding time resolved illumination return signal or backscattering vector $x \in R^N$ with two non-zero multipath components $x_{j1}$ (primary backscattering component) and $x_{j2}$ (secondary backscattering component) is shown in FIG. 3.

Typically, there are two main types of interfering optical rays, those generated by specular reflections and those generated by diffuse reflections. Specular returns are typically caused by the reflection of light via a specular surface, where all the incident light energy is reflected in a singular direction according to the law of reflection. Conversely, diffuse returns are associated to the scattering of light with a Lambertian surface. Lambertian surfaces are surfaces that scatter incident illumination equally in all directions. Although the latter reflection model is not physically plausible, it is a reasonable approximation to many real-world matter surfaces. These two different types of reflections generate different MPI effects. Specular reflections appear very concentrated in time (such as in the example of FIG. 3) while secondary diffuse reflections tend to be more spread. This difference translates to a different shape of the backscattering signal x.

Acquiring only a single correlation measure in an MPI scenario does typically not allow the separation of the multiple incoming interfering rays. Since the behavior of each reflected optical ray depends on a used modulation frequency, a common approach to deal with the MPI phenomenon is to acquire ToF measurement data at M≥1 modulation frequencies. The additional information provided by multiple correlation measures can be exploited in order to mitigate the effect of interfering rays, trying to separate the primary return from the others. Multi-frequency data can be acquired subsequently, illuminating the scene 12 with M amplitude modulated signals at frequencies $f_0$, $f_1, \ldots, f_{M-1}$, and capturing the M corresponding correlation functions. Another advantage of acquiring multi-frequency ToF measurement data is that different modulation frequencies have different unambiguous ranges, that can be combined in order to extend the overall unambiguous range.

The backscattering vector x contains important information about scene geometry. Therefore, its knowledge is useful in a wide range of applications. Capturing the propagation behavior of light at extreme temporal resolution can e.g. be exploited to see around corners, detect objects in highly scattering media, infer material properties from a distance, as well as perform optimal MPI correction. The direct acquisition of transient information may require highly expensive measurements tools based on femto-photography or interferometry-based systems. Another approach is to use techniques that reconstruct that backscattering information from a sparse set of measurements, like the AMCW ToF technology.

The acquisition process of ToF output or measurement data v (for a single pixel) can be described by a linear model $$v = \begin{bmatrix} v_0 \\ \vdots \\ v_{M-1} \end{bmatrix} = \begin{bmatrix} e^{j2\pi f_0 t_0} & \cdots & e^{j2\pi f_0 t_{N-1}} \\ \vdots & \ddots & \vdots \\ e^{j2\pi f_{M-1} t_0} & \cdots & e^{j2\pi f_{M-1} t_{N-1}} \end{bmatrix} \begin{bmatrix} x_0 \\ \vdots \\ x_{N-1} \end{bmatrix} = \Phi x,$$

which enforces a relationship between the backscattering vector $x \in \mathbb{R}^N$ and ToF measurement data $v \in \mathbb{C}^M$ acquired by the ToF camera 10. Considering also noise, the overall system becomes $$v = \Phi x + \eta.$$

The main objective is to develop a method able to invert the above equation system in order to estimate the unknown backscattering vector $x \in \mathbb{R}^N$ starting from noisy multi-frequency ToF measurement data $v \in \mathbb{C}^M$. This is an ambitious task because the underlying equation system is highly underdetermined (i.e., M<<N) and one aims to recover the whole signal x from far fewer samples than required by the Nyquist-Shannon sampling theorem. The estimation of the backscattering vector x is an ill-posed problem that does not admit a clear unique solution.

Figure 4:
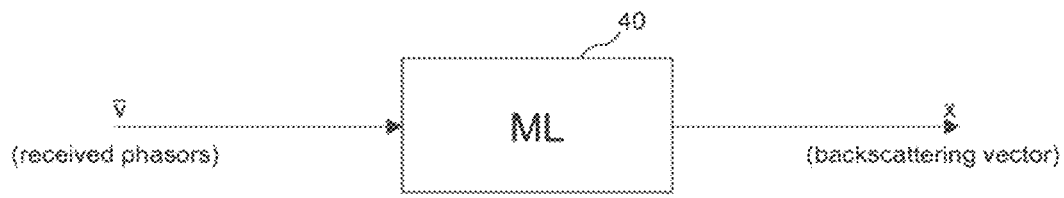
FIG. 4 illustrated a ML network according to an embodiment of the present disclosure.

As illustrated in FIG. 4, the present disclosure proposes to train a machine learning (ML) network 40 to transform ToF measurement data v of one or more pixels of an indirect ToF camera into a corresponding backscattering vector x, similarly to the measurement by a direct ToF camera. According to embodiments of the present disclosure, input data for the training is a simulated backscattering vector for one or more ToF pixel as ground truth and simulated ToF measurement data of said one or more ToF pixels that are subject to exactly this ground truth backscattering vector. This process can be done for all pixels of a ToF pixel array and/or for different modulation frequencies (e.g. 20, 50 and 60 MHz modulation frequency). The machine learning network 40 is then trained to estimate a backscattering vector with minimum loss compared to the ground truth backscattering vector for each pixel. A suitable distance metric may be the so-called Earth Mover Distance (EMD) between the estimated backscattering vector and the ground truth backscattering vector.

Figure 5:
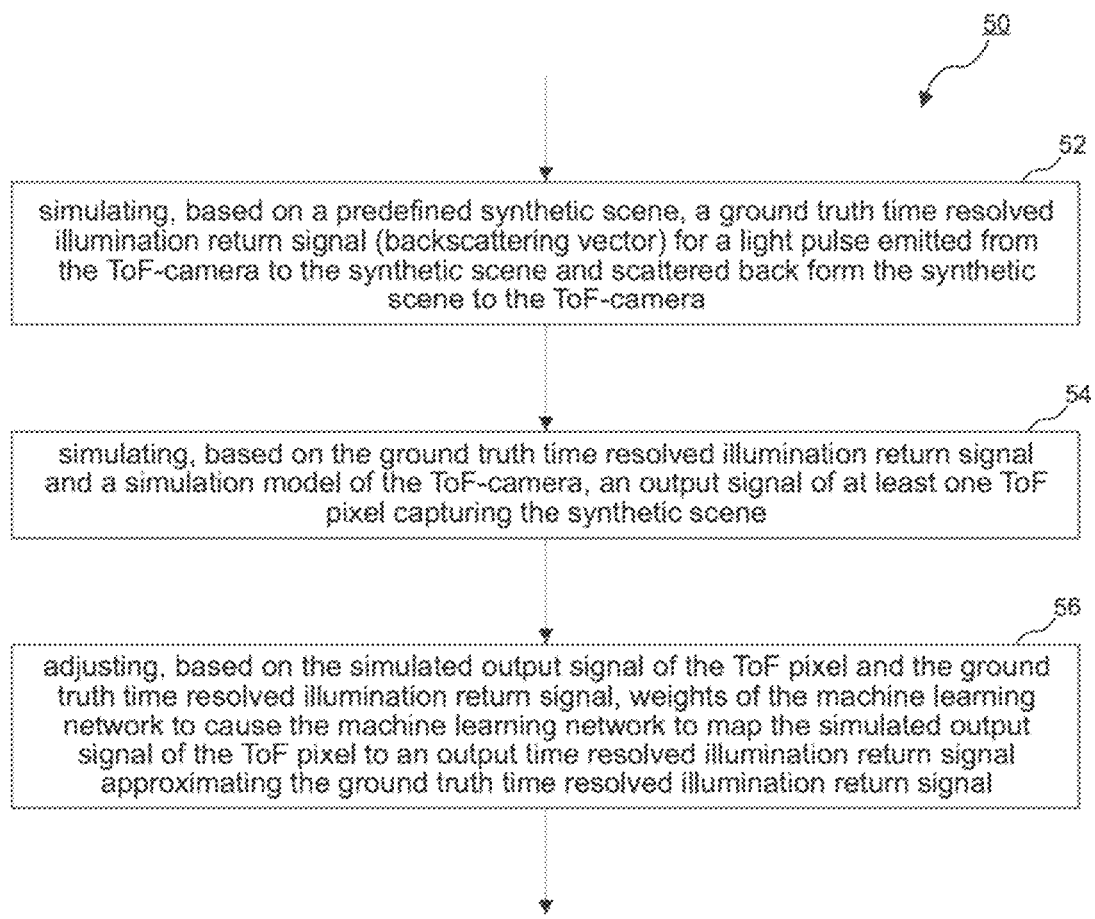
FIG. 5 shows a method of training a ML network for use with a ToF camera according to an embodiment of the present disclosure.

An overview of a proposed process 50 of training the machine learning network 40 for use with a ToF camera is shown in FIG. 5.

The training process 50 includes an act of simulating 52, based on a predefined synthetic scene, a ground truth backscattering vector for a light pulse emitted from the ToF camera to the synthetic scene and scattered back from the synthetic scene to the ToF camera. As will be explained below, the synthetic scene comprises a plurality of scene points with known optical properties and distances between each of the scene points and the ToF camera. This is a benefit of a synthetic or artificial scene. The training process 50 further includes an act of simulating 54, based on the ground truth backscattering vector and a simulation model of the ToF camera, an output signal of at least one ToF pixel capturing light from a point or a small region of the synthetic scene. The training process 50 further includes an act of adjusting 56, based on the simulated output signal of the ToF pixel and the ground truth backscattering vector, weights of the machine learning network 40 to cause the machine learning network 40 to map the simulated output signal v of the ToF pixel to an estimated backscattering vector approximating the ground truth backscattering vector.

The generation of the training data, i.e., the simulated ground truth backscattering vector and the simulated output signal of the ToF pixel, is a crucial part of the process 50. The use of one or more synthetic scenes and simulated data in accordance with the synthetic scene(s) enables the use of error free training data, because the machine learning network 40 is not trained to reconstruct a certain depth value but the ground truth backscattering vector of the synthetic scene. The ground truth backscattering vector can be simulated based on a predefined position of the ToF camera with respect to the artificial scene using transient rendering. Then the ground truth backscattering vector is also used to generate (by simulation act 54) the input data v for the machine learning network 40 (phasors and intensity data). Here it is desirable to use a possibly realistic simulation 54 of the ToF camera to transform the ground truth backscattering vector into phasor and intensity data. Specific camera properties, like the exact illumination shape and sensor sensitivity shape, as well as noise levels and other pixel properties can be included. It is important that ground truth backscattering vectors used for training show typical structures that resemble real scenes. Minor deviations are not critical here because the machine learning network 40 is not trained to reconstruct the scene, but only the backscattering vector of a single pixel or a small neighborhood of pixels. This may drastically reduce the complexity of the machine learning network 40 compared to a scene-context-based approach and may also make it highly parallelizable.

Thus, an idea underlying the present disclosure is to use a machine learning network 40, for example in form of a deep neural network (DNN) architecture, in order to learn an underlying reflection structure and use it as strong prior to optimize the estimation of the backscattering vector x. Deep neural networks turn out to be well-suited technical tools to accomplish the proposed task since they implement powerful machine learning models that have been proven to be able to capture complex structures on data and outperform other state-of-art algorithms on classification, regression as well as generation tasks.

Figure 6:
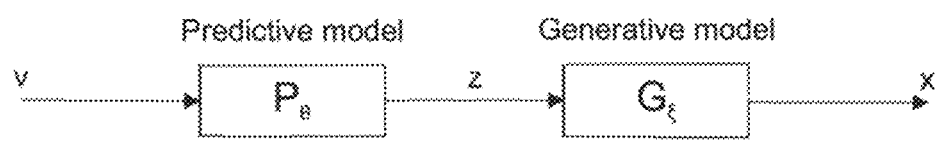
FIG. 6 illustrates an embodiment of the proposed deep learning approach including a predictive and a generative model.

As illustrated in FIG. 6, some embodiments of the proposed machine learning approach may rely on two main ingredients. One is a generative model $G_\xi$ that, starting from a compressed representation z, generates an output of the corresponding backscattering vector $x=G_\xi(z)$. The generative model Ga maps a latent variable $z \in R^L$ into an approximation of the backscattering domain. A second ingredient is a predictive model $P_\theta$ that takes as input the ToF measurement data v and predicts the most likely latent variable $z=P_\theta(v)$ that satisfies the above undetermined equation system.

In this way it is possible to decouple the problem of generating output vectors with a particular structure from the problem of predicting the output vector given the input ToF measures. The proposed pipeline of FIG. 6 allows to gain a finer control over the part of the machine learning network 40 that captures the characteristic structures of the backscattering vector $x \in R^N$, and helps to mitigate the negative effect of the high number of Degrees of Freedom (DoF). As already pointed out, there may be a significant difference between the input and output dimensions. Therefore, using a single model that starts from M input variables and outputs an N-dimensional backscattering vector, with M<<N, may lead to instabilities during an optimization phase and to a network converging to bad local minima. In contrast to directly optimizing the backscattering vector x, applying the proposed pipeline, the optimization is in the space of latent representation z, lying in a lower dimensional space by definition.

Let $D_x^* \subseteq R^N$ be the signal space where all possible backscattering vectors lie. Note that it depends on the propagation and reflection properties of light in a real environment and represents prior knowledge about the shape and the typical structure of each backscattering vector. The generative model Ga maps a latent variable $x \in R^L$ into an approximation of the backscattering domain $D_x \approx D_x^*$:

$$G_\xi: R^L \to D_x \subseteq R^N$$

$$z \to x = G_\xi(z)$$

With the constraint L<<N, the generative model $G_\xi$, through its proposed architecture, implicitly ensures that an output backscattering vector reflects a particular structure. A goal is to define a model whose range Da provides a good approximation of the backscattering domain $D_x^*$. The generative model Gg is parameterized by $\xi$ and is not subject to any particular requirement, given that the final goal is matched. The generative model $G_\xi$ can e.g. either be a fixed analytical model or some more advanced deep leaning generative model, like Variational Autoencoders (VAEs) or Generative Adversarial Networks (GANs). It is the first part of the overall approach that may be specified or trained. Once it has been defined, it may remain fixed during the optimization of the predictive model $P_\theta$. One requirement is that it should be differentiable in order to carry out the subsequent optimization of the predictive model $P_0$ through the backpropagation algorithm. In other words, it should be possible to compute the partial derivatives of the output backscattering vector with respect to the latent input variable, i.e.

$$\exists \frac{\partial x_n}{\partial z_i}, \forall n = 0, \ldots, N-1, i = 0, \ldots, L-1.$$

The second ingredient of the proposed pipeline of FIG. 6 is the predictive model $P_\theta$ that, given in input the raw ToF data $v \in C^M$, is going to predict the latent variable $z \in R^L$ which is the most likely solution of the underdetermined system, under some noise tolerance:

$$P_\theta: C^M \to R^L$$

$$v \to z = P_\theta(v)$$

subject to the soft-constraint:

$$v = \Phi G_\xi(z)$$

Embodiments of the present disclosure propose a neural network architecture for the predictive model $P_\theta$ and subsequently optimize its weights $\theta$ in order to learn the relationship between inputs v and outputs x, minimizing a suitable loss function. In contrast to directly optimizing the backscattering vector x, the optimization can be carried on in the space of latent representation z, keeping fixed the parameters of the generative model Gg.

The design of a "good" loss function, which satisfies some desirable properties, is a critical point that will be discussed in more detail below. For now, since the predictive model $P_\theta$ has to accomplish two goals simultaneously, it may be assumed that also its loss function can be divided into two main terms, a measurement error $l_m$ and a reconstruction error $l_r$. The measurement error $l_m$ may quantify how consistent the final prediction is with the measurement model, in others word it may force the predicted backscattering vector to be a solution of the underdetermined equation system under some noise tolerance:

$$l_m = l_m(v, \Phi \dot{x})$$

The second term, called reconstruction error $l_r$, may measure the "goodness" of the machine learning network 40 to fit the ground truth, and therefore it tries to select between all the possible solutions the most likely one. The machine learning network 40 will learn the typical probability distribution of the solution from the data ground truth:

$$l_r = l_m(x, \dot{x}),$$

where the output backscattering vector $\dot{x}$ is obtained by the composition of the predictive and the generative model, i.e. $\dot{x} = G_\xi(P_\theta(v))$. Therefore, overall loss function, computed for a single sample (v, x), is given by:

$$l(v,x) = l_m(v, \Phi \dot{x}) + l_r(x, \dot{x})$$

One objective of the proposed training procedure 50 is to minimize the reconstruction error $l_r$ between ground truth backscattering vector x and output backscattering vector $\dot{x}$.

In order to train the machine learning network 40 in a supervised manner, a dataset containing ground truth backscattering vectors of captured scenes is needed. The acquisition of real ground truth transient scenes typically requires highly expensive instruments able to capture light transport events at extreme temporal resolution. Therefore, embodiments make use of a synthetic, simulated environment, for example by 3D-rendering. Rendering or image synthesis denotes an automatic process of generating an image/scene from a 2D or 3D model by means of computer programs. A scene file may contain objects in a strictly defined language or data structure. It may contain geometry, viewpoint, texture, lighting, and shading information as a description of the virtual scene. The data contained in the scene file may then be passed to a rendering program to be processed and output to a digital image or raster graphics image file. For example, there are publicly available synthetic datasets created with the intent to be used for the training of machine learning algorithms working on ToF artefacts removal and designed to be easily augmented and as generalized as possible. Such synthetic datasets may provide static and dynamic transient scenes generated using a transient rendering engine Since a synthetic dataset is generated in a simulated synthetic environment, each scene comes with the corresponding depth ground truth. Starting from the raw transient synthetic scenes, applying a proper measurement model of the ToF camera, it is possible to simulate the ToF measurement data v (correlation measures) captured by a ToF camera sensor.

As already mentioned, for illustrative purposes the MPI effect can be approximated using the sparse reflection model illustrated in FIG. 2. This approximation is adopted by the majority of MPI correction concepts proposed in the literature and is the most treatable from a mathematical point of view. In particular, we consider as backscattering domain $D_x^R \subseteq D_x^*$ that is the signal space formed by at most $R \geq 1$ sparse reflections:

$$D_x^R = \{x \in R^N | \|x\|_0 \leq R\},$$

where the L0 norm is defined as the total number of non-zero elements. For this merely illustrative and very specific case it is not necessary to train a complex generative neural network in order to develop a suitable generative model $G_\xi$, because it can be fully described by a sum of $R \geq 1$ Kronecker delta functions. More in details, given a latent variable z in the form:

$$z = [A_1, T_1, A_2, T_2, \ldots, A_R, T_R]^T \in R^{2R}$$

the sparse generative model can be defined as:

$$x = G^R(z) = [x_0, \ldots, x_{N-1}]^T \in \mathcal{D}_x^R \text{ with}$$

$$x_n = \sum_{r=1}^R A_r \delta(n - T_r)$$

where the Kronecker delta is:

$$\delta(n - j) = \begin{cases} 1 & \text{if } n = j \\ 0 & \text{if } n \neq j \end{cases}$$

Figure 7:
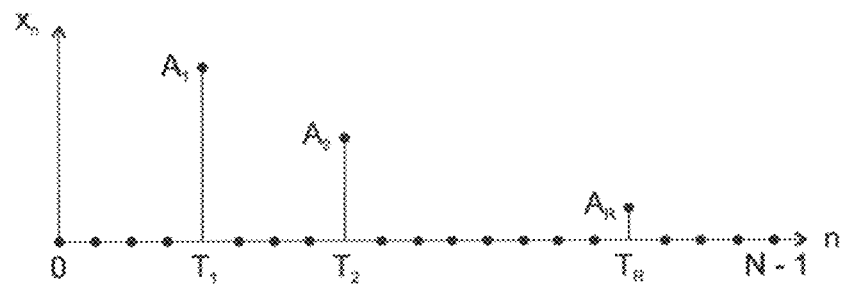
FIG. 7 illustrates a backscattering vector in accordance with a parse generative model.

In this context the latent variable z assumes an explicit meaning, each pair $(A_r, T_r)$ represents amplitude and time position of the rth sparse reflection (see FIG. 7).

A first issue with this formulation of the sparse generative model is that it is not differentiable due to the impulsive nature of the Kronecker delta function. In the continuous case, the equivalent Dirac function can be regarded as a Gaussian function for a standard deviation that tends to zero. An idea to make the sparse generative model differentiable is to substitute the Kronecker delta with a sampled Gaussian function with very small standard deviation, that is:

$$x_n = \sum_{r=1}^R A_r e^{-\frac{(n-T_r)^2}{2\sigma^2}}, \sigma \ll 1$$

Using this approximation, it is possible to compute the partial derivatives of the output backscattering vector x with respect to the input latent variable z:

$$\frac{\partial x_n}{\partial A_r} = \frac{\delta}{\delta A_r}\left[\sum_{j=1}^R A_j e^{-\frac{(n-T_j)^2}{2\sigma^2}}\right] = e^{-\frac{(n-T_r)^2}{2\sigma^2}}, \quad r = 1, \ldots, R$$

$$\frac{\partial x_n}{\partial T_r} = \frac{\delta}{\delta T_r}\left[\sum_{j=1}^R A_j e^{-\frac{(n-T_j)^2}{2\sigma^2}}\right] = A_r \frac{n - T_r}{\sigma^2} e^{-\frac{(n-T_r)^2}{2\sigma^2}}, \quad r = 1, \ldots, R$$

Figures 8A, 8B:
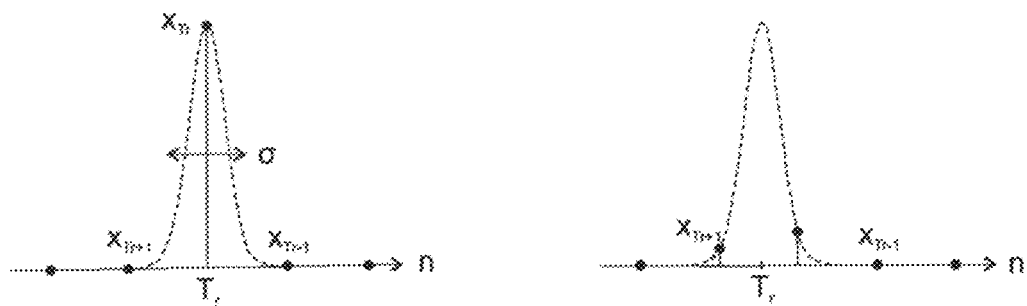
FIG. 8A, B illustrates approximations of a Kronecker delta with a sampled Gaussian function.

The value for the small standard deviation $\sigma > 0$ may be chosen in order to have a good approximation of the Kronecker delta after the sampling operation, as illustrated in FIG. 8A. We may constrain the ratio between the amplitude of two adjacent samples ${}^xT_r - 1 = {}^xT_r + 1$ and the amplitude of the central sample ${}^xT_r$ to be smaller than a given threshold:

$$\frac{x_{T_r-1}}{x_{T_r}} = e^{-\frac{1}{2\sigma}} < T \rightarrow \sigma < -\frac{1}{2 \ln T}$$

Another issue is related to the discrete nature of the output backscattering vector. In particular, the time position of each sparse reflection should be an integer number, while typically the latent variable z is formed by all real components. Note that approximating the Kronecker delta with a Gaussian function allows to have also real time positions, but the sampling operation leads to a completely wrong output (see FIG. 8B). The simplest approach is to round each time position $T_r \in R$ to the nearest integer number $\hat{T}_r = Q(T_r) \in N$ before applying the above Gaussian model:

$$x_n = \sum_{r=1}^R A_r e^{-\frac{(n-\hat{T}_r)^2}{2\sigma^2}}$$

For example, the rounding may be achieved through a uniform mid-tread quantizer with unitary quantization step like the one depicted in FIG. 9:

$$\hat{x} = Q(x) = \left\lfloor x + \frac{1}{2} \right\rfloor \in \mathbb{N}, x \in [0, N-1] \subset \mathbb{R}$$

Unfortunately, the quantization is not a differentiable operation and therefore the whole generative model G& would become non-differentiable. Here, a trick can be applied that is not perfectly mathematically correct but it is stable from a numerical point of view and makes the model differentiable. During the computation of the partial derivatives of the output backscattering vector with respect to the time position of each sparse reflection, we can ignore the quantizer, approximating the non-differentiable quantization rule with an identity function. Then the final expressions for the partial derivatives of the sparse generative model become:

$$\frac{\delta}{\delta A_r} = e^{-\frac{(n-\hat{T}_r)^2}{2\sigma^2}}, \quad r = 1, \ldots, R$$

$$\frac{\partial x_n}{\partial T_r} = \frac{\delta x_n}{\delta \hat{T}_r} \underbrace{\frac{\delta Q(T_r)}{\delta T_r}}_{\approx 1} \approx A_r \frac{n - \hat{T}_r}{\sigma^2} e^{-\frac{(n-\hat{T}_r)^2}{2\sigma^2}}, \quad r = 1, \ldots, R$$

To ease understanding, the proposed concept is described in the simplest case, that is the ideal case where it is assumed that the backscattering vector is formed by a single sparse reflection and there is no MPI effect. The skilled person having benefit from the present disclosure will appreciate that this is a strong suboptimal assumption for a real-world scenario. However, the objective is to perform a feasibility study about the proposed concept. In this context the sparse generative model discussed above is adopted. In particular, we consider the single sparse reflection case defined as follows:

$$G^1: \begin{array}{c} \mathbb{R}^2 \to \mathcal{D}_x^1 \subseteq \mathbb{R}^N \\ z = [A_1, T_1]^T \to x = G^1(z) = [x_0, \ldots, x_{N-1}]^T \end{array}$$

with $$x_n = A_1 e^{-\frac{(n-\hat{T}_x)^2}{2\sigma^2}}$$

Moreover, to ease understanding, a single pixel-level is considered, meaning that the predicted backscattering vector for pixel (u, v) is a function only of the corresponding pixel in the input raw ToF data:

$$X_{uv} = G^1(Z_{uv}) = G^1(P_0(V_{uv}))$$

The skilled person having benefit from the present disclosure will appreciate that this may be a simplified assumption. The goal is to achieve performance comparable with the standard ToF single frequency technique for depth estimation. Since some embodiments take as input the information provided by three modulation frequencies $f_0 < f_1 < f_2$, to be fair, the comparison has to be performed with respect to the best case for the single frequency technique. Consider the best case means the frequency with higher depth resolution and noise resilience, that is the higher modulation frequency $f_2$. The other frequencies are used only to unwrap the phase and obtain a depth value in the correct range. A possibility to combine multiple measurements at different frequencies for phase unwrapping is exploiting the Chinese Remainder Theorem (CTR). The unwrapped depth obtained using the single frequency approach may be given by:

$$d = \frac{cArg(v_2)}{4\pi f_2} \in [d_{min}, d_{max}]$$

In the remaining section, example implementations of a predictive neural network for the predictive model $P_\theta$, its architecture and the training strategy are discussed.

For the implementation of the predictive model $P_\theta$ it is proposed to employ a neural network that takes as input the (simulated) ToF measurement data v and predicts the latent variable z associated to the corresponding backscattering vector x. This process can be repeated for each pixel of the ToF camera sensor in order to obtain an output of the complete transient scene. In some embodiments, the predictive model $P_\theta$ may work on tensors with fixed spatial resolution W×H and with variable number of channels. For example, an input tensor X may have 2M=6 channels, corresponding to the real and the imaginary part of the complex phasor acquired for each of the three modulation frequencies, while an output tensor Z has L=2 channels, corresponding to amplitude and position of the single sparse reflection that should be predicted. Since in principle all the ToF pixels are equivalent, the inversion of the underdetermined system v=Φx+η can be performed for each pixel using the same model.

Moreover, in this first step it may be worked at pixel-level and so there is a one-to-one correspondence between input and output pixels. For this illustrative example, a convolutional network architecture with kernel of size 1×1 in the spatial dimensions and a given number of filters for each layer may be used. This is equivalent to the implementation of a fully-connected network along the channels dimension, which works in the same manner for all the pixels. The architecture of an example predictive neural network 100 for the illustrative case of a single sparse reflection is depicted in FIG. 10A. The table shown in FIG. 10B illustrates hyperparameters of each layer of neural network 100. It is made by a first stack of 3 convolutional layers all with 64 filters, that is supposed to denoise the input ToF measurement data v and extract relevant features. Then the network 100 is split into two parallel specialized branches 102-1, 102-2. Starting from the features extracted by the first layers One branch 102-1 aims to predict the amplitude $A_1$, while the other one 102-2 aims to predict the position $T_1$ of the single sparse reflection. Both the two branches 102-1, 102-2 can be formed by three convolutional layers with decreasing number of filters, respectively 32, 16 and 1. Finally, the two branches 102-1, 102-2 are concatenated to produce the output latent variable $z=[A_1, T_1]^T$. All hidden layers may have a ReLU activation function, while the two output layers may have a sigmoid activation.

Another example architecture of a predictive neural network 110 for the case of double sparse reflection is depicted in FIG. 11A. The table shown in FIG. 11B illustrates hyperparameters of each layer of neural network 110. The network 110 is also split into two parallel specialized branches 112-1, 112-2. Starting from the features extracted by the first layers, one branch 112-1 aims to predict the amplitudes $A_1$, $A_2$, while the other branch 112-2 aims to predict the positions $T_1$, $T_2$ of the sparse reflections. Both the two branches 112-1, 112-2 can be formed by three convolutional layers with decreasing number of filters, respectively 32, 16 and 2. Finally, the two branches 112-1, 112-2 are concatenated to produce the output latent variable $z=[A_1, T_1, A_2, T_2]^T$. The hidden layers may have a ReLU activation function, while the two output layers may have a sigmoid activation.

The skilled person having benefit from the present disclosure will appreciate that the neural networks 100, 110 are merely illustrative examples of machine learning network 40 and that the structure of machine learning network 40 can be tailored to specific needs of scenes and/or used ToF cameras. As has been explained before, in order to train the predictive model $P_\theta$ in a supervised manner, a proper training set with ground truth is needed. According to embodiments, ground truth backscattering vectors for each pixel and for each modulation frequency can be simulated, for example with ray tracing tools, based on an assumed position of the ToF camera relative the predefined synthetic scene.

One objective of the optimization procedure (training) 50 is to minimize the reconstruction error $l_i$ between ground truth backscattering vector x and estimated backscattering vector $\hat{x}$. Therefore, it can play a fundamental role of driving the machine learning algorithm toward the optimal solution. Mathematically, a loss function maps a certain event onto a real number, intuitively representing the "cost" associated with the event. In a supervised context, typically the event is represented by the output prediction of the algorithm and the loss function measures the difference between the output and the known ground truth. The choice of the loss function can be dependent on the task under investigation and unfortunately there is not universal loss function that works for all kind of data. Examples of loss functions are L1 and L2 loss functions, Hard max and Soft max loss functions, or cross-correlation based loss functions. An overview of the mentioned loss functions is provided in the following table.

TABLE 1

| Loss | Definition |
|---|---|
| $L_1$ | $\ell_{L1}(x, \hat{x}) = \sum_{n=0}^{N-1} \lvert x_n - \hat{x}_n \rvert$ |
| $L_2$ | $\ell_{L2}(x, \hat{x}) = \sum_{n=0}^{N-1} (x_n - \hat{x}_n)^2$ |
| HARD | $\ell_{HARD}(x, \hat{x}) = \lvert \max_n \hat{x} - \max_n x \rvert + \lvert \operatorname{argmax}_n \hat{x} - \operatorname{argmax}_n x \rvert$ |
| SOFT | $\ell_{SOFT}(x, \hat{x}) = \lvert \operatorname{soft\,max}_n \hat{x} - \operatorname{soft\,max}_n x \rvert + \lvert \operatorname{soft\,argmax}_n \hat{x} - \operatorname{soft\,argmax}_n x \rvert$ |
| $CC_1$ | $\ell_{CC1}(x, \hat{x}) = \left\lvert 1 - \sum_{k=-N+1}^{N-1} e^{-\frac{k^2}{2\sigma^2}} \cdot r_k \right\rvert$ |
| $CC_2$ | $\ell_{CC2}(x, \hat{x}) = \sum_{k=-N+1}^{N-1} e^{-\frac{k^2}{2\sigma^2}} \cdot \lvert 1 - r_k \rvert$ |

For embodiments of the present disclosure it has been found that an adequate loss function between ground truth backscattering vector x and output backscattering vector $\hat{x}$ may be the Earth Mover's Distance (EMD):

$$\ell_{EMD}(x, \hat{x}) = \sum_{n=0}^{N-1} \lvert CDF(x)_n - CDF(\hat{x})_n \rvert$$

The skilled person having benefit from the present disclosure will appreciate that EMD can e.g. be computed by solving an instance of transportation problem, using any algorithm for minimum cost flow problem, e.g. the network simplex algorithm.

Figure 12:
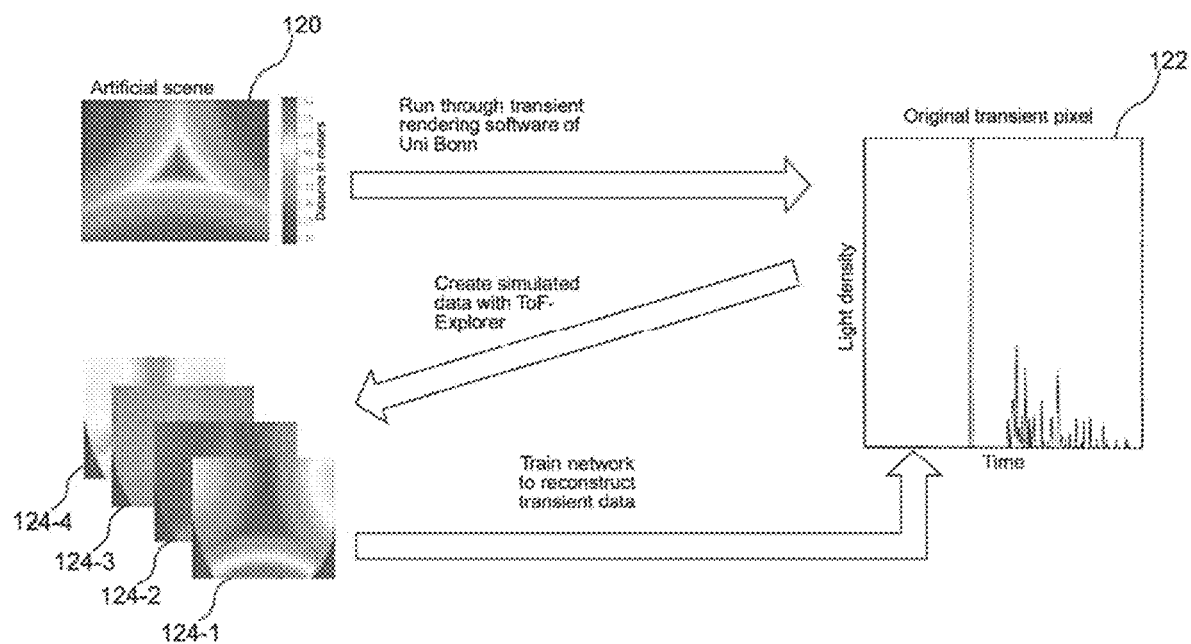
FIG. 12 provides an overview of the proposed concept of training a ML network for use with a ToF camera.

The proposed concept of the present disclosure is summarized with reference to FIG. 12.

Figure 13:
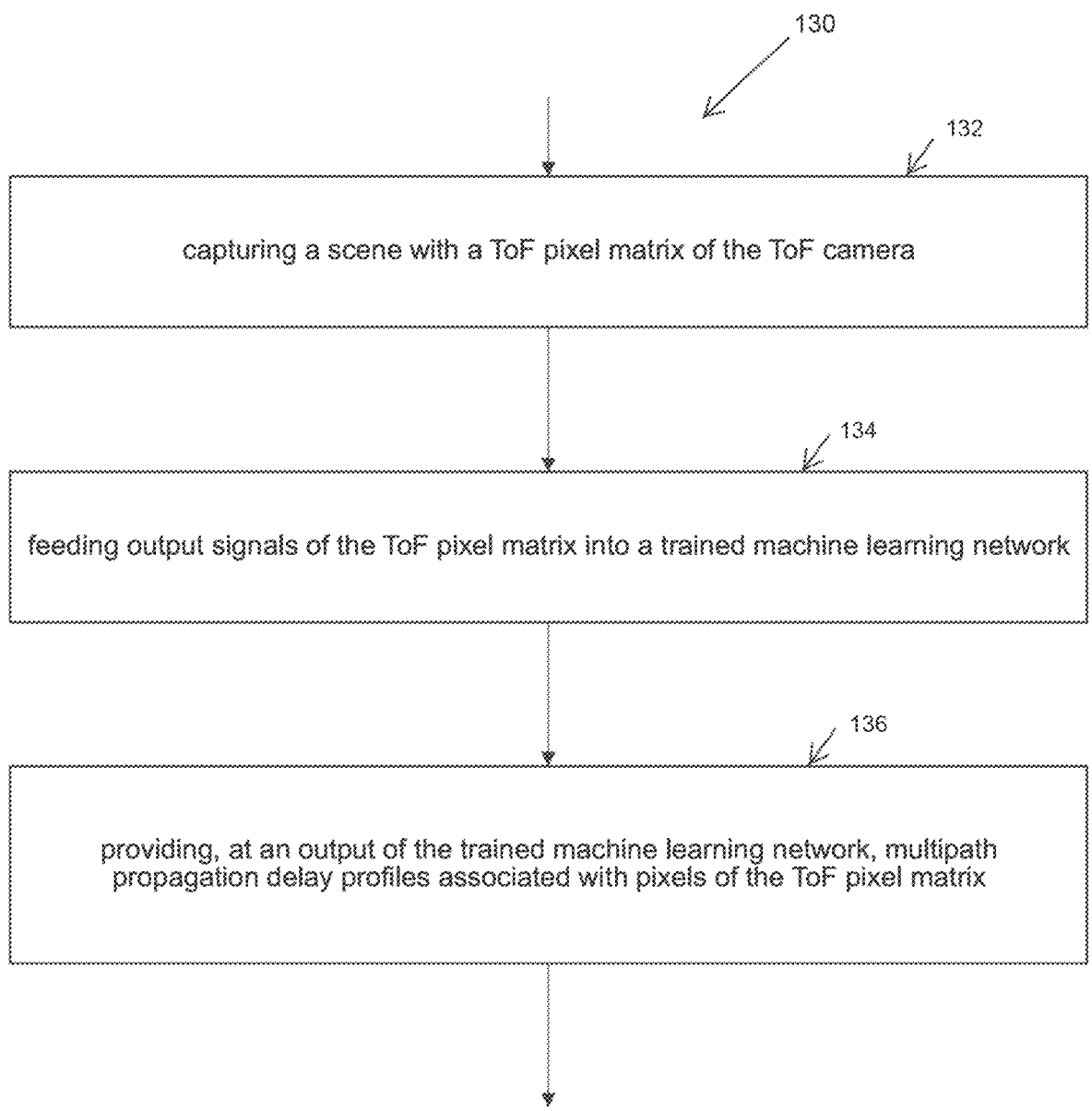
FIG. 13 shows a method of operating a ToF camera according to an embodiment of the present disclosure.

By using data of a predefined synthetic 3D scene 120 and location data of a ToF pixel as input for a transient rendering software, a ground truth backscattering vector 122 can be computed. Based on the ground truth backscattering vector 122 and a simulation model of the ToF camera, ToF measurement data 124-1 can be computed for the ToF pixel. The previous acts can be repeated for different modulation frequencies to compute ToF measurement data 124-1, ..., 124-4 for each of the different modulation frequencies, leading to ToF measurement data vector v for the ToF pixel. The machine learning network is then trained based on the computed ToF measurement data vector v and the ground truth backscattering vector 122 to compute an output backscattering vector $\hat{x}$ minimizing the reconstruction error $l_r$ between the computed ground truth backscattering vector 122 and output backscattering vector $\hat{x}$ for said ToF pixel or a group of pixels. The previous procedure can then be repeated for all pixels of the ToF camera and for all available synthetic scenes. Once the machine learning network is trained it can e.g. be used to output backscattering vectors $\hat{x}$ for each pixel of a real ToF camera corresponding to the simulated ToF camera. This is illustrated in FIG. 13 showing a flowchart of a method 130 for operating a ToF camera.

The method 130 includes an act 132 of capturing a scene with a ToF pixel matrix of the ToF camera, an act 134 of feeding output signals of the ToF pixel matrix into a machine learning network trained according to the present disclosure, and an act 136 of providing, at an output of the machine learning network, backscattering vectors $\hat{x}$ associated with pixels of the ToF pixel matrix.

The backscattering vectors $\hat{x}$ may allow more conclusions about material properties in the scene. For example, position and height of first peak may give information about albedo of material (together with surface normal). A strong second peak may indicate a strong specular reflection. A smooth secondary distribution may indicate strong Lambertian reflection. Also, semi-translucent objects may be detected. The optical density of scattering material can be measured (fog/smoke) and objects inside/behind it can be made visible.

Note that the present technology can also be configured as described below.

(1) Method of training a machine learning network for use with a ToF camera, the method comprising:
  simulating, based on a predefined synthetic scene, a ground truth time resolved illumination return signal for a light pulse emitted from the ToF camera to the synthetic scene and scattered back from the synthetic scene to the ToF camera, wherein the synthetic scene comprises a plurality of scene points with known distances between each of the scene points and the ToF camera;
  simulating, based on the ground truth time resolved illumination return signal and a simulation model of the ToF camera, an output signal of at least one ToF pixel capturing the synthetic scene; and
  adjusting, based on the simulated output signal of the ToF pixel and the ground truth time resolved illumination return signal, weights of the machine learning network to cause the machine learning network to map the simulated output signal of the ToF pixel to an output time resolved illumination return signal approximating the ground truth time resolved illumination return signal.

(2) The method of Example (1), wherein simulating the output signal comprises simulating the output signal of the ToF pixel for a plurality of different light modulation frequencies to obtain a respective output signal for each of the different light modulation frequencies, and wherein the weights of the machine learning network are adjusted based on the simulated output signals for the different light modulation frequencies as input to the machine learning network and based on the ground truth multipath propagation delay profile.

(3) The method of Example (1) or (2), wherein simulating the ground truth time resolved illumination return signal comprises, based on transient rendering, reconstructing non-line-of-sight light components scattered back from the synthetic scene to the ToF camera.

(4) The method of any one of Examples (1) to (3), wherein adjusting the weights of the machine learning network comprises minimizing a difference between the output time resolved illumination return signal and the ground truth time resolved illumination return signal.

(5) The method of Example (4), wherein the difference is measured according to the earth mover's distance, EMD.

(6) The method of any one of Examples (1) to (5), wherein the method of training is repeated for each of the plurality of scene points and/or a plurality of different predefined synthetic scenes.

(7) The method of any one of Examples (1) to (6), wherein the simulation model of the ToF camera models specific camera properties including at least one of exact illumination shape, sensor sensitivity shape, and noise levels.
(8) The method of any one of Examples (1) to (7), wherein the machine learning network comprises a convolutional network architecture.
(9) The method of any one of Examples (1) to (8), wherein the ToF camera is an indirect ToF camera.
(10) A computer program having a program code for performing the method of any one of Examples (1) to (9), when the computer program is executed on a programmable hardware device.
(11) Method for operating a ToF camera, the method comprising:
capturing a scene with a ToF pixel matrix of the ToF camera;
feeding output signals of the ToF pixel matrix into a machine learning network trained according to the method of any one of the previous Examples and
providing, at an output of the machine learning network, time resolved illumination return signals associated with pixels of the ToF pixel matrix.
(12) A computer program having a program code for performing the method of Example (11), when the computer program is executed on a programmable hardware device.
(13) A ToF camera comprising a machine learning network trained according to the method of any one of Examples (1) to (9).
(14) The ToF camera according to Example (13), wherein an input layer of the machine learning network is coupled to an output of a ToF pixel matrix of the ToF camera.
(15) The ToF camera according to any one of Examples (13) or (14), wherein the machine learning network is configured to output a time resolved illumination return signal associated with each pixel of the ToF pixel matrix.
(16) The ToF camera according to any one of Examples (13) to (15), wherein the ToF camera is an indirect ToF camera.

The aspects and features mentioned and described together with one or more of the previously detailed examples and figures, may as well be combined with one or more of the other examples in order to replace a like feature of the other example or in order to additionally introduce the feature to the other example.

Embodiments may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a preprocessing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

Examples may further be or relate to a computer program having a program code for performing one or more of the above methods, when the computer program is executed on a computer or processor. Steps, operations or processes of various above-described methods may be performed by programmed computers or processors. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), any other type of processor or processing circuit. Other types of circuits that may be included in a computer system may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system may also include a display device, one or more speakers, and a keyboard and/or controller, which can include a mouse, trackball, touch screen, voice-recognition device, or any other device that permits a system user to input information into and receive information from the computer system.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine-readable carrier.

Other embodiments comprise the computer program for performing one of the methods described herein, stored on a machine-readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A method of training a machine learning network for use with a Time-of-Flight (ToF) camera, the method comprising:

simulating, based on at least one predefined synthetic scene, a ground truth time resolved illumination return signal for a light pulse emitted from the ToF camera to the synthetic scene and scattered back from the synthetic scene to the ToF camera, wherein the synthetic scene comprises a plurality of scene points with known distances between each of the scene points and the ToF camera and the ground truth time resolved illumination return signal includes a ground truth backscattering response of the synthetic scene to the light pulse;

simulating, using (1) the simulated ground truth time resolved illumination return signal for the light pulse emitted from the ToF camera to the synthetic scene and scattered back from the synthetic scene to the ToF camera that includes the ground truth backscattering response of the synthetic scene to the light pulse and (2) a simulation model of the ToF camera, an output signal of at least one ToF pixel capturing light from the synthetic scene; and training the machine learning network by:

taking, as training input, (A) the simulated ground truth time resolved illumination return signal for the light pulse emitted from the ToF camera to the synthetic scene and scattered back from the synthetic scene to the ToF camera that includes the ground truth backscattering response of the synthetic scene to the light pulse and (B) the simulated output signal of the ToF pixel, and adjusting, based on (A) the simulated output signal of the ToF pixel and (B) the simulated ground truth time resolved illumination return signal for the light pulse emitted from the ToF camera to the synthetic scene and scattered back from the synthetic scene to the ToF camera that includes the ground truth backscattering response of the synthetic scene to the light pulse, weights of the machine learning network to cause the machine learning network to map the simulated output signal of the ToF pixel to an output time resolved illumination return signal approximating the simulated ground truth time resolved illumination return signal, wherein the ToF camera is an indirect ToF camera, and wherein the machine learning network is not trained to reconstruct a depth value.

2. The method of claim 1, wherein simulating the output signal comprises simulating the output signal of the ToF pixel for a plurality of different light modulation frequencies to obtain a respective output signal for each of the different light modulation frequencies, and wherein the weights of the machine learning network are adjusted based on the simulated output signals for the different light modulation frequencies as input to the machine learning network and based on a ground truth multipath propagation delay profile.

3. The method of claim 1, wherein simulating the ground truth time resolved illumination return signal comprises, based on transient rendering, simulating non-line-of-sight light components scattered back from the synthetic scene to the ToF camera.

4. The method of claim 1, wherein adjusting the weights of the machine learning network comprises minimizing a difference between the output time resolved illumination return signal and the simulated ground truth time resolved illumination return signal.

5. The method of claim 4, wherein the difference is measured according to the earth mover's distance, EMD.

6. The method of claim 1, wherein the method of training is repeated for each of a plurality of scene points and/or a plurality of different predefined synthetic scenes.

7. The method of claim 1, wherein the simulation model of the ToF camera models specific camera properties that include at least one of exact illumination shape, sensor sensitivity shape, or noise levels.

8. The method of claim 1, wherein the machine learning network comprises a convolutional network architecture.

9. A method for operating a ToF camera, the method comprising:

capturing a scene with a ToF pixel matrix of the ToF camera;

feeding output signals of the ToF pixel matrix into the machine learning network trained according to the method of claim 1; and providing, at an output of the machine learning network, time resolved illumination return signals associated with pixels of the ToF pixel matrix.

10. A non-transitory computer readable medium storing a computer program which when executed by a programmable hardware device causes the programmable hardware device to perform the method of claim 1.

11. A physical ToF camera comprising:

the machine learning network trained according to the method of claim 1;

a light source; and a sensor.

12. The physical ToF camera according to claim 11, wherein an input layer of the machine learning network is coupled to an output of a ToF pixel matrix of the ToF camera.

13. The physical ToF camera according to claim 12, wherein the machine learning network is configured to output a time resolved illumination return signal associated with each pixel of the ToF pixel matrix.

14. The physical ToF camera according to claim 11, wherein the ToF camera is an indirect ToF camera.

15. The method of claim 1, wherein the simulated ground truth time resolved illumination return signal taken as the training input includes a plurality of signal echo components corresponding to multipath propagation of the light pulse in the synthetic scene.

16. The method of claim 1, wherein the simulated ground truth time resolved illumination return signal taken as the training input is a backscattering vector.

* * * * *